United States Patent
Fujino et al.

(10) Patent No.: US 9,947,433 B2
(45) Date of Patent: Apr. 17, 2018

(54) THERMOPLASTIC RESIN COMPOSITION AND MOLDED PRODUCT USING THE SAME

(75) Inventors: Shingo Fujino, Nagoya (JP); Takayuki Hase, Nagoya (JP); Satoshi Matsubara, Nagoya (JP)

(73) Assignee: Toray Industries, Inc. (JP)

( * ) Notice: Subject to any disclaimer, the term of this patent is extended or adjusted under 35 U.S.C. 154(b) by 685 days.

(21) Appl. No.: 14/006,798

(22) PCT Filed: Dec. 14, 2011

(86) PCT No.: PCT/JP2011/006992
§ 371 (c)(1),
(2), (4) Date: Sep. 23, 2013

(87) PCT Pub. No.: WO2012/131829
PCT Pub. Date: Oct. 4, 2012

(65) Prior Publication Data
US 2014/0011011 A1   Jan. 9, 2014

(30) Foreign Application Priority Data
Mar. 25, 2011   (JP) .................. 2011-067018

(51) Int. Cl.
*H01B 3/42* (2006.01)
*C09K 19/38* (2006.01)
*C08K 3/04* (2006.01)

(52) U.S. Cl.
CPC ............... *H01B 3/421* (2013.01); *C08K 3/04* (2013.01); *C09K 19/3809* (2013.01)

(58) Field of Classification Search
CPC ....... C08K 3/04; C09K 19/3809; C08L 67/03; H01B 3/421
USPC .......................................... 428/220; 524/496
See application file for complete search history.

(56) References Cited

U.S. PATENT DOCUMENTS

| | | | | |
|---|---|---|---|---|
| 4,728,698 A | * | 3/1988 | Isayev ..................... | C08L 69/00 264/108 |
| 6,121,369 A | | 9/2000 | Stack et al. | |
| 7,008,991 B2 | * | 3/2006 | Takagi ..................... | C08K 3/04 252/511 |
| 7,618,552 B2 | * | 11/2009 | Hosoda ................... | C08L 67/00 252/299.01 |
| 2004/0119056 A1 | | 6/2004 | Hofmann et al. | |
| 2008/0015284 A1 | | 1/2008 | Cakmak et al. | |

FOREIGN PATENT DOCUMENTS

| | | |
|---|---|---|
| EP | 0 307 205 A2 | 3/1989 |
| GB | 2 165 850 A | 4/1986 |
| JP | 61-055146 A | 3/1986 |
| JP | S62-119008 A | 5/1987 |
| JP | 01-127318 A | 5/1989 |

(Continued)

OTHER PUBLICATIONS

Machine Translation of JP 2007-131774 A. 2007.*

*Primary Examiner* — Brian Handville
(74) *Attorney, Agent, or Firm* — DLA Piper LLP (US)

(57) ABSTRACT

A thermoplastic resin composition includes 0.1 to 20 parts by weight of a carbon black relative to 100 parts by weight of a thermoplastic resin, wherein the carbon black is dispersed in the thermoplastic resin composition to have a maximum particle diameter of not greater than 50 μm.

6 Claims, 3 Drawing Sheets

(56) References Cited

FOREIGN PATENT DOCUMENTS

| | | | |
|---|---|---|---|
| JP | H07-196894 A | 8/1995 |
| JP | 10-101945 | 4/1998 |
| JP | H10-101945 A | 4/1998 |
| JP | 2000-230120 A | 8/2000 |
| JP | 2000-281885 | 10/2000 |
| JP | 2001-279066 A | 10/2001 |
| JP | 2004-529229 A | 9/2004 |
| JP | 2007-500771 A | 1/2007 |
| JP | 2007-131774 A | 5/2007 |
| JP | 2007131774 A | * | 5/2007 |
| JP | 2008-247985 A | 10/2008 |
| JP | 2009-179763 | 8/2009 |
| JP | 2009-179763 A | 8/2009 |
| JP | 2009-242453 | 10/2009 |
| JP | 2011-089111 A | 5/2011 |

* cited by examiner

THERMOPLASTIC RESIN COMPOSITION AND MOLDED PRODUCT USING THE SAME

TECHNICAL FIELD

This disclosure relates to a thermoplastic resin composition and a molded product using the same. More specifically, the disclosure relates to a carbon black-containing thermoplastic resin composition and a thin-wall molded product using the same, which are favorably used in applications that require black color.

BACKGROUND

In recent years, with increased demand for high-performance plastics, many polymers of various novel properties have been developed and come onto the market. Especially thermoplastic resins are widely used because of their easy processability, for example, in injection molding. Among them, addition of carbon black for black coloring a product is a generally performed and employed for various components in a wide variety of applications such as automobile components, electric and electronic components, precision machine components and office machine components.

In the case of using a general carbon black, however, the carbon black is likely to produce aggregates, which may cause problems such as reduced strength and insulation failure.

The following resin compositions have been disclosed as the black-colored thermoplastic resin composition. For example, a polyamide composition for color molding has been disclosed (see, e.g., JP S61-55146 A) to contain (i) ethylene bis stearamide and (ii) a carbon black having the particle diameter of 8 to 120 μm in addition to a polyamide resin. A polyphenylene sulfide resin has also been disclosed (see, e.g., JP 2000-230120 A) to contain a carbon black having pH 8 or higher pH in addition to a polyphenylene sulfide resin. These resin compositions, however, have insufficient dispersion of carbon black, which may cause insulation failure in recent thin-wall molded products.

On the other hand, among the thermoplastic resins, liquid crystalline resins that are characterized by the parallel arrangement of molecular chains and show optical anisotropy have been noted because of their excellent flowability, heat resistance, low gas emission and excellent mechanical properties.

The liquid crystalline resin is used as the material suitable for thin-walled parts or electric and electronic components of complicated shapes by taking into account the above characteristics and is employed, for example, connectors, camera modules, relays, switches and coil bobbins. With the recent "light and compact" trend, further reduction of the wall thickness has been strongly demanded in the shape of products. With respect to the above electric and electronic components, further improvements in mechanical strength and flowability have been demanded for the resin composition. On the other hand, there have been the more rigorous quality requirements in production year after year: for example, reducing the percent defective, such as the occurrence of random short in the injection molding process and preventing the resin composition powder from falling off the molding surface in the assembly process. For example, with respect to the connectors, while the wall thickness between the metal terminals of a molded product has further been reduced, a black-colored liquid crystalline resin has been needed for the purpose of simplified discrimination among a plurality of different components to be assembled and easy image analysis for the appearance inspection of the products. With respect to optical components such as camera modules, while a black-colored liquid crystalline resin has been needed from the standpoints of good flowability and light blocking effect, it is strictly demanded to prevent the resin composition powder from falling off the surface of a molded product, which may cause a failure in imaging.

The following resin compositions have additionally been disclosed as the black-colored liquid crystalline resin composition. For example, a liquid crystalline resin composition has been disclosed (see, e.g., JP H07-196894 A) to contain carbon black having pH of 3.5 to 10 relative to 100 parts by weight of a liquid crystalline polyester. A thermoplastic resin composition has also been disclosed (see, e.g., JP H10-101945 A) to contain 0.01 to 10 parts by weight of a carbon black having a dibutyl phthalate (hereinafter referred to as DBP) adsorption amount of not greater than 150 ml/100 g relative to 100 parts by weight of a thermoplastic resin. A liquid crystalline polyester composition has also been disclosed (see, e.g., JP 2001-279066 A) to contain (i) 0.1 to 10 parts by weight of a carbon black having the average particle diameter of 5 to 20 nm and the DBP absorption amount of 60 to 200 cm$^3$/100 g; and (ii) 0 to 180 parts by weight of a fibrous and/or plate-like inorganic filler relative to 100 parts by weight of a liquid crystalline polyester. These resin compositions may, however, produce aggregates of the carbon black and may cause insulation failure between thin-walled metal terminals by the aggregates of the carbon black in molded products such as connectors. The insulation failure is a problem revealed after assembly of products and accordingly has the significant influence on the entire products. An improvement in insulating properties has accordingly been demanded.

The following liquid crystalline resin composition has accordingly been disclosed as the liquid crystalline resin composition having excellent insulating properties, heat resistance and mechanical properties (see, e.g., JP 2009-179763 A). This liquid crystalline resin composition contains: (i) 100 parts by weight of a liquid crystalline resin; (ii) 1 to 10 parts by weight of a carbon black having the primary particle diameter of 10 to 50 nm; and (iii) 0.1 to 10 parts by weight of a talc having the median diameter of 1 to 20 μm. In this liquid crystalline resin, the carbon black is dispersed to have the average particle diameter of not greater than 50 μm.

The above proposed method, however, still causes the presence of carbon black particles having the maximum particle diameter of greater than 50 μm and has difficult in maintaining the insulating properties between recent thinner-walled metal terminals. Production of carbon aggregates may cause a resistance in a thin-wall part of a molded product during resin flow or may cause clogging, which increases the likelihood of a failure such as the occurrence of random short in injection molding. Additionally, the carbon black aggregates may cause the rough surface of a molded product and may cause the resin composition powder to fall off the surface of a molded product, for example, during assembly.

It could therefore be helpful to provide a thermoplastic resin composition having excellent thin-wall flow stability and being capable of producing a molded product that has excellent insulating property even in applications including thin-wall parts that require black color and reduces the resin composition powder falling off the surface of the molded product.

SUMMARY

We thus provide:
(1) A thermoplastic resin composition comprising 0.1 to 20 parts by weight of a carbon black relative to 100 parts by weight of a thermoplastic resin. In this thermoplastic resin composition, the carbon black is dispersed in the thermoplastic resin composition to have a maximum particle diameter of not greater than 50 μm.

(2) The thermoplastic resin composition described in (1). In this thermoplastic resin composition, the carbon black has a primary particle diameter of 70 to 200 nm.

In this thermoplastic resin composition, the carbon black has a ratio (a1/a2) of (a1) DBP absorption amount (ml/100 g) to (a2) primary particle diameter (nm) of the carbon black that is 0.5 to 1.5 (ml/100 g·nm).

In the thermoplastic resin composition described in (1), however, the primary particle diameter may be less than 70 nm. Alternatively the primary particle diameter may be greater than 200 nm.

In the thermoplastic resin composition described in (1), the ratio (a1/a2) may be less than 0.5 (ml/100 g·nm). Alternatively the ratio (a1/a2) may be greater than 1.5 (ml/100 g·nm).

(3) The thermoplastic resin composition described in either (1) or (2). In this thermoplastic resin composition, the carbon black has a specific surface area of 10 to 40 (m$^2$/g) by BET low-temperature nitrogen adsorption method.

In the thermoplastic resin composition described in either (1) or (2), however, the specific surface area may be less than 10 (m$^2$/g). Alternatively, in the thermoplastic resin composition described in either (1) or (2), the specific surface area may be greater than 40 (m$^2$/g).

(4) The thermoplastic resin composition described in any of (1) to (3), wherein the thermoplastic resin is a liquid crystalline polyester that forms an anisotropic melt phase.

In the thermoplastic resin composition described in any of (1) to (3), however, the thermoplastic resin may be a liquid crystalline polyester that does not form an anisotropic melt phase.

(5) The thermoplastic resin composition described in (4), wherein the liquid crystalline polyester has structural units (I), (II), (III), (IV) and (V) shown below. In this thermoplastic resin composition, a content of the structural unit (I) is 65 to 80 mol % relative to a total amount of the structural units (I), (II) and (III). Content of the structural unit (II) is 55 to 85 mol % relative to a total amount of the structural units (II) and (III). Content of the structural unit (IV) is 50 to 95 mol % relative to a total amount of the structural units (IV) and (V)

(I)

(II)

(III)

(IV)

-continued (V)

In the thermoplastic resin composition described in (4), however, the content of the structural unit (I) may be less than 65 mol % relative to the total amount of the structural units (I), (II) and (III). The content of the structural unit (I) may alternatively be greater than 80 mol % relative to the total amount of the structural units (I), (II) and (III).

In the thermoplastic resin composition described in (4), the content of the structural unit (II) may be less than 55 mol % relative to the total amount of the structural units (II) and (III). The content of the structural unit (II) may alternatively be greater than 85 mol % relative to the total amount of the structural units (II) and (III).

In the thermoplastic resin composition described in (4), the content of the structural unit (IV) may be less than 50 mol % relative to the total amount of the structural units (IV) and (V). The content of the structural unit (IV) may alternatively be greater than 95 mol % relative to the total amount of the structural units (IV) and (V).

The liquid crystalline polyester contained in the thermoplastic resin composition described in (4) may not have at least part of the structural units (I), (II), (III), (IV) and (V).

(6) The thermoplastic resin composition described in any of (1) to (5), further comprising 1 to 200 parts by weight of an inorganic filler relative to a total 100 parts by weight of the thermoplastic resin and the carbon black.

In the thermoplastic resin composition described in any of (1) to (5), however, the content of the inorganic filler may be less than 1 part by weight. Alternatively, in the thermoplastic resin composition described in any of (1) to (5), the content of the inorganic filler may be greater than 200 parts by weight.

(7) A manufacturing method of the thermoplastic resin composition described in any of (1) to (6) by melt-kneading at least a thermoplastic resin and a carbon black supplied to a twin-screw extruder. In this manufacturing method of the thermoplastic resin composition, a residence time (initial residence time) along a length from a material input position (L0) of the thermoplastic resin and the carbon black to a position of 3 L/10 relative to a whole length (L) of the twin-screw extruder from the material input position (L0) to a discharge position is not greater than 15% of a residence time along the whole length of the twin-screw extruder (entire residence time). In this manufacturing method of the thermoplastic resin composition, a maximum shear rate along a length from the position of 3 L/10 to the discharge position is 1000 to 10000 (sec$^{-1}$).

In the manufacturing method of the thermoplastic resin composition described in any of (1) to (6), however, the initial residence time may be greater than 15% of the entire residence time.

In the manufacturing method of the thermoplastic resin composition described in any of (1) to (6), the above maximum shear rate along the length from the position of 3 L/10 to the discharge position may be less than 1000 (sec$^{-1}$). Alternatively the above maximum shear rate along the length from the position of 3 L/10 to the discharge position may be greater than 10000 (sec$^{-1}$).

Another method different from the method of melt-kneading at least the thermoplastic resin and the carbon black supplied to the twin-screw extruder may be employed for the manufacturing method of the thermoplastic resin composition described in any of (1) to (6).

(8) A molded product manufactured by molding the thermoplastic resin composition described in any of (1) to (6).

(9) The molded product described in (8) that includes a part having wall thickness of not greater than 0.1 mm.

The thermoplastic resin composition has high thin-wall flow stability and is capable of producing a molded product that has the excellent insulating property and the reduced resin composition powder falling off the surface of the molded product.

DESCRIPTION OF SYMBOLS

G1 Gates
B-2 Carbon black aggregates

DETAILED DESCRIPTION

The thermoplastic resin is a synthetic resin that shows flowability by heating and is moldable and workable by taking advantage of this characteristic. Concrete examples of the thermoplastic resin include polyphenylene ether, polyphenylene sulfide, polyamide resins (e.g., nylon 6 and nylon 66), polyester resins (e.g., polyethylene terephthalate, polybutylene terephthalate and polybutylene naphthalate), polyoxymethylene, acrylonitrile-butadiene-styrene copolymers, polystyrene and liquid crystalline polyester.

Among them, from the standpoints of the mechanical properties and the moldability, polyphenylene sulfide, polyamide resins such as nylon 6 and nylon 66, polybutylene terephthalate, polyoxymethylene and liquid crystalline polyester are preferable.

The advantageous effects are expected especially for the liquid crystalline polyester composition that has excellent thin-wall flowability and is thus frequently used for products including lots of thin-wall parts.

The following describes an example using liquid crystalline polyester as the thermoplastic resin.

(A) The liquid crystalline polyester has structural units selected from the group including, for example, aromatic oxycarbonyl unit, aromatic and/or aliphatic dioxy units, and aromatic and/or aliphatic dicarbonyl units and forms an anisotropic melt phase.

The aromatic oxycarbonyl unit may be structural unit derived from, for example, p-hydroxybenzoic acid or 6-hydroxy-2-naphthoic acid, and p-hydroxybenzoic acid is preferable. The aromatic and/or aliphatic dioxy unit may be structural unit derived from, for example, 4,4'-dihydroxybiphenyl, hydroquinone, 3,3',5,5'-tetramethyl-4,4'-dihydroxybiphenyl, t-butyl hydroquinone, phenyl hydroquinone, 2,6-dihydroxynaphthalene, 2,7-dihydroxynaphthalene, 2,2-bis(4-hydroxyphenyl)propane, 4,4'-dihydroxydiphenyl ether, ethylene glycol, 1,3-propylene glycol or 1,4-butanediol, and 4,4'-dihydroxybiphenyl and hydroquinone are preferable. The aromatic and/or aliphatic dicarbonyl unit may be structural unit derived from, for example, terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, adipic acid or sebacic acid, and terephthalic acid and isophthalic acid are preferable.

(A) Concrete examples of the liquid crystalline polyester include: liquid crystalline polyester having structural unit derived from p-hydroxybenzoic acid and 6-hydroxy-2-naphthoic acid; liquid crystalline polyester having structural unit derived from p-hydroxybenzoic acid, structural unit derived from 6-hydroxy-2-naphthoic acid and structural unit derived from an aromatic dihydroxy compound, an aromatic dicarboxylic acid and/or an aliphatic dicarboxylic acid; liquid crystalline polyester having structural unit derived from p-hydroxybenzoic acid, structural unit derived from 4,4'-dihydroxybiphenyl and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from 4,4'-dihydroxybiphenyl, structural unit derived from hydroquinone and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from ethylene glycol and structural unit derived from terephthalic acid and/or isophthalic acid; liquid crystalline polyester having structural unit derived from p-hydroxybenzoic acid, structural unit derived from ethylene glycol, structural unit derived from 4,4'-dihydroxybiphenyl and structural unit derived from terephthalic acid and/or an aliphatic dicarboxylic acid, such as adipic acid or sebacic acid; liquid crystalline polyester having structural unit derived from p-hydroxybenzoic acid, structural unit derived from ethylene glycol, structural unit derived from an aromatic dihydroxy compound and structural unit derived from an aromatic dicarboxylic acid, such as terephthalic acid, isophthalic acid, or 2,6-naphthalenedicarboxylic acid; and liquid crystalline polyester having structural unit derived from 6-hydroxy-2-naphthoic acid, structural unit device from 4,4'-dihydroxybiphenyl and structural unit derived from 2,6-naphthalenedicarboxylic acid. The liquid crystalline polyester may be a mixture of two or more of these examples.

Among these liquid crystalline polyesters, liquid crystalline polyester having structural units (I), (II), (III), (IV) and (V) shown below is preferable. This liquid crystalline polyester has improved dispersibility of carbon black. Using this liquid crystalline polyester in combination with the production method described later enables more favorable dispersion of carbon black in the liquid crystalline polyester composition The structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit.

The content of the structural unit (I) is preferably 65 to 80 mol % relative to the total amount of the structural units (I), (II) and (III). Specifically, for the improved dispersibility of carbon black, the content of the structural unit (I) is more preferably 68 to 78 mol %.

The content of the structural unit (II) is preferably 55 to 85 mol % relative to the total amount of the structural units (II) and (III). Specifically, for the improved dispersibility of carbon black, the content of the structural unit (II) is more preferably 55 to 78 mol % and most preferably 58 to 73 mol %.

The content of the structural unit (IV) is preferably 50 to 95 mol % relative to the total amount of the structural units (IV) and (V). Specifically, for the improved dispersibility of carbon black, the content of the structural unit (IV) is more preferably 55 to 90 mol % and most preferably 60 to 85 mol %.

The total amount of the structural units (II) and (III) is preferably substantially equimolar with the total amount of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition. An excess of dicarboxylic acid component or dihydroxy component may be added to control the terminal groups of the polymer.

The liquid crystalline polyester may be produced by a known polyester polycondensation method. For example, the following production methods are preferably employed:

(1) method of producing the liquid crystalline polyester by deacetylation polycondensation reaction from p-acetoxybenzoic acid, 4,4'-diacetoxybiphenyl, diacetoxybenzene, terephthalic acid and isophthalic acid;

(2) method of producing the liquid crystalline polyester by acylation of phenolic hydroxyl group though reactions of p-hydroxybenzoic acid, 4,4'-dihydroxybiphenyl, hydroquinone, terephthalic acid and isophthalic with acetic anhydride and subsequent deacetylation polycondensation reaction;

(3) method of producing the liquid crystalline polyester by dephenolation polycondensation reaction from phenyl p-hydroxybenzoate, 4,4'-dihydroxybiphenyl, hydroquinone, diphenyl terephthalate and diphenyl isophthalate; and (4) method of producing the liquid crystalline polyester by diphenyl esterification through reactions of p-hydroxybenzoic acid and an aromatic dicarboxylic acid, such as terephthalic acid or isophthalic acid with specified amounts of diphenyl carbonate and subsequent dephenolation polycondensation reaction with addition of an aromatic dihydroxy compound, such as 4,4'-dihydroxybiphenyl or hydroquinone.

In the process of producing the liquid crystalline polyester by deacetylation polycondensation reaction, the melt polymerization method is preferably employed to complete the polycondensation reaction under reduced pressure at a temperature at which the liquid crystalline polyester melts. For example, specified amounts of p-hydroxybenzoic acid, 4,4'-dihydroxybiphenyl, hydroquinone, terephthalic acid, isophthalic acid and acetic anhydride may be mixed in a reaction vessel and heated with stirring in nitrogen atmosphere for acetylation of the hydroxyl group. The temperature of the reaction mixture may then be further raised to the melt temperature of the liquid crystalline polyester, and the polycondensation reaction may be completed under reduced pressure. The reaction vessel may be equipped with stirring blades, may be equipped with a distillation pipe, and may be equipped with an outlet provided in its lower portion.

At a temperature at which the resulting polymer melts, the reaction vessel may be pressurized to, for example, about 1.0 kg/cm$^2$ (0.1 MPa), and the resulting polymer may be discharged in the form of strands from the outlet provided in the lower portion of the reaction vessel. The melt polymerization method is advantageous to produce the homogeneous polymer and preferably gives the excellent polymer with less gas evolution.

The polycondensation reaction of the liquid crystalline polyester proceeds without a catalyst, but a metal compound, such as tin (II) acetate, tetrabutyl titanate, potassium acetate, sodium acetate, antimony trioxide, or metal magnesium may be used as the catalyst.

The contents of the respective structural units are calculable from an area ratio of peaks corresponding to the respective structural units by $^1$H-NMR spectroscopy, in which the liquid crystalline polyester is weighed in an NMR (nuclear magnetic resonance) sample tube and is dissolved in a liquid crystalline polyester-soluble solvent (for example, pentafluorophenol/tetrachloroethane-$d_2$ mixture).

A melting point (Tm) is determinable with a differential scanning calorimeter. After observation of an endothermic peak temperature (Tm1) in measurement with heating the liquid crystalline polyester at a rate of 40° C./minute from room temperature, the temperature is sequentially maintained at Tm1+20° C. for 5 minutes, then decreased to room temperature at a rate of 20° C./minute, and increased again at a rate of 20° C./minute. An endothermic peak temperature (Tm2) observed during the re-heating process is determined as the melting point (Tm).

The melt viscosity of the liquid crystalline polyester is preferably 1 to 200 Pa·s, is more preferably 10 to 200 Pa·s and is especially preferably 10 to 100 Pa·s. The melt viscosity herein is measured with a Koka-type flow tester at a shear rate of 1000/s under the temperature condition of the melting point of the liquid crystalline polyester+10° C.

The thermoplastic resin composition may contain 0.1 to 20 parts by weight of carbon black relative to 100 parts by weight of the above thermoplastic resin. The carbon black content of less than 0.1 parts by weight reduces the dispersibility of carbon black and decreases the thin-wall flow stability and additionally causes difficulty in achieving a desired degree of blackness. The carbon black content is preferably not less than 1.0 part by weight. The carbon black content of greater than 20 parts by weight, on the other hand, decreases the thin-wall flow stability and additionally reduces the insulating property of a molded product manufactured by molding the thermoplastic resin composition. The carbon black content is preferably not greater than 10 parts by weight.

According to the thermoplastic resin composition, it is characteristic that carbon black is dispersed to have the maximum particle diameter of not greater than 50 μm in the thermoplastic resin composition. The dispersion herein indicates the state that carbon black is finely scattered in a phase containing the thermoplastic resin. The state that carbon black is dispersed to have the maximum particle diameter of not greater than 50 μm means that carbon black is finely dispersed in the phase containing the thermoplastic resin. In the state that carbon black is dispersed to have the average particle diameter of not greater than 50 μm, the presence of some carbon black aggregates having the larger particle diameter may cause resistance to the flow of the thin-wall part or cause clogging during molding or may cause the resin composition powder to fall off the surface of the molded product. We thus focus on the maximum particle diameter of carbon black and control the maximum particle diameter of carbon black in the composition to be not greater than 50 μm to improve the thin-wall flow stability of the thermoplastic resin composition, improve the insulating property of a molded product produced by molding the thermoplastic resin composition and reduces the resin composition powder falling off the surface of the molded product. The maximum particle diameter of carbon black is preferably not greater than 40 μm and is more preferably not greater than 30 μm. The maximum particle diameter of carbon black in the thermoplastic resin composition may be calculated by observing a total cross sectional area of 10 cm² of pellets of the thermoplastic resin composition or a molded product with an optical microscope at the 500 to 1000-fold magnification and measuring the length of the long diameter of the maximum secondary particle among the observed secondary particles of carbon black.

The carbon black preferably has the primary particle diameter of 70 to 200 nm. The carbon black has the varying likelihood of aggregation according to the size of primary particles, and the carbon black of the smaller primary particle diameter is likely to aggregate. Controlling the primary particle diameter of the carbon black to be not less than 70 nm improves the dispersibility of the carbon black in the thermoplastic resin composition and enables the carbon black to be readily dispersed in the composition to have the maximum particle diameter of not greater than 50 μm. This further improves the thin-wall flow stability of the resin composition, further improves the insulating property of the molded product and further reduces the resin composition powder falling off the surface of the molded product. The primary particle diameter of not less than 80 nm is more preferable. To reduce the content required for achieving a desired degree of blackness and maintain the high mechanical strength of the molded product, the primary particle diameter is preferably not greater than 200 nm, more preferably not greater than 150 nm and furthermore preferably not greater than 120 nm.

The primary particle diameter of carbon black indicates an arithmetic average of the measurements of the diameter with an electron microscope and may be determined by the method described in page 114 of Carbon Black Yearbook No. 48 (1998) published by Carbon Black Association. More specifically, the method observes the carbon black at the 20000-fold magnification with a transmission electron microscope, measures the diameter of any fifty carbon black particles and calculates the number-average value of the fifty carbon black particles.

The carbon black preferably has a ratio (a1/a2) of (a1) DBP absorption amount (ml/100 g) to (a2) primary particle diameter (nm) of 0.5 to 1.5 (ml/100 g·nm). The DBP absorption amount indicates the development degree of adhesion of the primary particles of carbon black (aggregate), i.e., the index of "structure" and quantizes the structure by the absorption amount of dibutyl phthalate per 100 g of carbon black. The ratio (a1/a2) of the DBP absorption amount to the primary particle diameter indicates the development degree of the structure per unit length of the primary particle diameter. It is preferable to satisfy both the conditions that the primary particle diameter of carbon black is 70 to 200 nm and that the ratio (a1/a2) of the DBP absorption amount to the primary particle diameter is 0.5 to 1.5 (ml/100 g·nm). Specifically, the carbon black having the primary particle diameter of 70 to 200 nm and additionally satisfying the ratio (a1/a2) of not less than 0.5 (ml/100 g·nm) further improves the dispersibility of carbon black. The ratio (a1/a2) of not less than 0.80 (ml/100 g·nm) is more preferable. The ratio (a1/a2) of not greater than 1.5 (ml/100 g·nm), on the other hand, prevents an electrically conductive path from being formed by the structure in the thermoplastic resin composition and thereby enables the insulating property to be kept at the higher level, while readily achieving a desired degree of blackness. The ratio (a1/a2) of not greater than 1.40 (ml/100 g·nm) is more preferable.

The DBP absorption amount may be determined by the method described in JIS K6217 (2001).

The BET specific surface area of the carbon black is preferably 10 to 40 (m²/g). The BET specific surface area means the surface area per unit weight determined by adsorption of an inert gas. The BET specific surface area of not less than 10 (m²/g) reduces the content required to achieve a desired degree of blackness. The BET specific surface area of not less than 15 (m²/g) is more preferable. The BET specific surface area of not greater than 40 (m²/g), on the other hand, further improves the dispersibility of carbon black. The BET specific surface area of not greater than 35 (m²/g) is more preferable.

The BET specific surface area may be calculated by multipoint measurement using a low-temperature nitrogen adsorption device Sorptomatic 1800 (manufactured by Carlo Erba Co., Ltd).

The carbon black may be, for example, channel black type, furnace black type, lampblack type, thermal black type, Ketjen black type or naphthalene black type or may be a mixture of two or more of these examples. Among them, especially preferable are furnace black type and lampblack type, but any of commercially available carbon blacks for black coloring having the desired properties described above may be used as the carbon black.

The thermoplastic resin composition may further contain (C) an inorganic filler to improve the mechanical strength and the dimensional property of the molded product. Examples of the inorganic filler include glass fibers, silica fibers, silica alumina fibers, zirconia fibers, boron nitride fibers, silicon nitride fibers, boron fibers, potassium titanate fibers, aluminum borate fibers, wollastonite, quartz powder, aluminum silicate, kaolin, glass beads, glass balloons, glass flakes, silica, calcium carbonate, magnesium carbonate, titanium oxide, zinc oxide, alumina, mica and talc. For the purpose of further reduction of the resin composition powder falling off the surface of the molded product, for example, mica and talc are preferable. Among the fibrous inorganic fillers such as glass fibers, milled fiber having the number-average fiber length of 30 to 300 μm is preferable. The inorganic filler may be a mixture of two or more of these examples.

In the thermoplastic resin composition, the content of the inorganic filler is preferably 1 to 200 parts by weight relative to the total content of 100 parts by weight of the thermoplastic resin and the carbon black. The inorganic filler content of not less than 1 part by weight further improves the mechanical strength and the dimensional property of the molded product. The inorganic filler content of not less than 10 parts by weight is more preferable. The content of (C) inorganic filler of not greater than 200 parts by weight, on the other hand, causes the relatively high content of the thermoplastic resin and thereby further improves the mechanical strength of the molded product. The inorganic filler content of not greater than 120 parts by weight is more preferable.

The thermoplastic resin composition may contain any of general additives including antioxidants and heat analyzers (e.g., hindered phenol, hydroquinone, phosphites and their substitutes), UV absorbers (e.g., resorcinol and salicylate, benzotriazole and benzophenone), mold release agents (e.g., montanic acid and its salts, its esters and its half esters, stearyl alcohol, stearamide and polyethylene wax), plasticizers, flame retardants, flame retardant aids and antistatic agents; and other thermoplastic resins (e.g., fluororesin) to an extent that does not interfere with the desired effect of the disclosure to provide specific properties.

The thermoplastic resin composition may be obtained, for example, melt-kneading the thermoplastic resin and the carbon black and optionally the other components. The method employed for melt-kneading may be a method of melt-kneading at the temperature of 200 to 350° C. using, for example, any of a Banbury mixer, a rubber roller, a kneader, a single-screw extruder and a twin-screw extruder. To control the carbon black in the thermoplastic resin composition to have the maximum particle diameter of not greater than 50 μm, it is preferable to use a twin-screw extruder for melt-kneading. Both the co-rotating twin-screw extruder and the counter-rotating twin-screw extruder are usable as the twin-screw extruder. The melt-kneading temperature is preferably the melting point (Tm) of each thermoplastic resin described later ±10° C.

To finely disperse the carbon black in the thermoplastic resin composition, the residence time of the thermoplastic resin composition (initial residence time) along the length from the material input position (L0) of the thermoplastic resin and the carbon black to the position of 3 L/10 relative to the whole length (L) of the twin-screw extruder from the material input position (L0) to the discharge position is preferably not greater than 15% of the residence time along the whole length of the twin-screw extruder (entire residence time). This prevents mutual aggregation of the carbon black particles by compression in the twin-screw extruder and facilitates fine dispersion of the carbon black. More specifically, in the state that the thermoplastic resin is not melt, it is preferable to minimize installation of kneading disks, which may cause extension of the initial residence time, but to mainly locate flight screws rotating in the same direction as the extruding direction along the length between L0 and 3 L/10. The initial residence time is determinable by locating a barrel with an opening structure (open vent) on the upper surface at the position of 3 L/10 of the twin-screw extruder and measuring the arrival time from the start of the material input to the open vent. The entire residence time is determinable by measuring the time from the start of material input to discharge of the thermoplastic resin composition from the end of the extruder.

It is preferable to locate a plurality of kneading disks along the length from the position of 3 L/10 to the discharge position, i.e., in the kneading section. The maximum shear rate in the kneading section is preferably not lower than 1000 (sec$^{-1}$) and more preferably not lower than 2000 (sec$^{-1}$) to sufficiently knead the respective components and finely disperse the carbon black. To reduce evolution of heat by shearing and inhibit degradation of the thermoplastic resin and the other components, on the other hand, the maximum shear rate is preferably not higher than 10000 (sec$^{-1}$) and more preferably not higher than 8000 (sec$^{-1}$) The maximum shear rate (sec$^{-1}$) may be calculated from the barrel inner diameter D (mm) of the extruder, the minimum clearance S (mm) between the inner wall of the barrel and the kneading disk and the screw rotation speed n (rpm) according to the following equation:

$$\gamma max = D \times n \times \pi / (60 \times S).$$

The maximum shear rate in the kneading section is readily adjustable to a desired range by controlling the minimum clearance S (mm) between the inner wall of the barrel and the kneading disk or by controlling the screw rotation speed n (rpm).

The contents of the carbon black, the inorganic filler and the other additives contained in the liquid crystalline polyester composition obtained by the above method are generally equal to the respective amounts added for producing the liquid crystalline polyester composition.

The thermoplastic resin composition may be molded by a known molding method to produce any of various molded products. Examples of the molded product include: electric and electronic components, such as various gears, various casings, sensors, LED components, liquid crystal backlight bobbins, connectors, sockets, resistors, relay cases, relay spools and bases, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, and computer components; domestic and office electric appliance components, such as video tape recorder components, TV set components (plasma, organic EL and liquid crystal), irons, hair dryers, rice cooker components, microwave oven components, acoustic components, audio equipment components for audios, laserdiscs and compact disks, lighting components, refrigerator components, and air conditioner components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, ECU connectors, horn terminals, electric component insulators, step motor rotors, lamp sockets, lamp reflectors, lamp housings, brake pistons, solenoid bobbins, engine oil filters and ignition cases.

Among the thermoplastic resin compositions, the liquid crystalline polyester composition has the excellent thin-wall flow stability and is capable of producing a molded product that has the high insulating property and the reduced resin composition powder falling off the surface of the molded product. The liquid crystalline polyester composition is thus preferably used for a molded product of black color that is required to have insulating properties and includes thin-wall parts having the wall thickness of not greater than 0.1 mm. More specifically, the liquid crystalline polyester composition is favorably used for: small electric and electrical components, for example, narrow-pitch connectors, ECU connectors, switches, coil bobbins for small motors, relay components; camera module components used for cell phones and digital cameras; LED covers and their peripheral components.

EXAMPLES

The following describes the advantageous effects more in detail with reference to examples.

The composition analysis and the property evaluation of the liquid crystalline polyester were performed by the following methods:

(1) Composition Analysis of Liquid Crystalline Polyester

Composition analysis of the liquid crystalline polyester was performed by $^1$H-nuclear magnetic resonance spectroscopy ($^1$H-NMR). The liquid crystalline polyester of 50 mg was weighed in an NMR sample tube, was dissolved in 800 µl of a solvent (pentafluorophenol/1,1,2,2,-tetrachloroethane-$d_2$=65/35 (ratio by weight) mixed solvent), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition of the liquid crystalline polyester was analyzed from the ratio of the areas of peaks corresponding to the respective structural units observed in the spectral range of 7 to 9.5 ppm.

(2) Measurement of Melting Points (Tm) of Liquid Crystalline Polyester

The melting point (Tm) of the liquid crystalline polyester was measured by differential scanning calorimetry. After observation of an endothermic peak temperature (Tm1) in measurement with heating the liquid crystalline polyester at a rate of 40° C./minute from room temperature, the temperature was sequentially maintained at Tm1+20° C. for 5 minutes, then decreased to room temperature at a rate of 20° C./minute, and increased again at a rate of 20° C./minute. An endothermic peak temperature (Tm2) observed during the re-heating process was specified as the melting point (Tm).

(3) Measurement of Melt Viscosity of Liquid Crystalline Polyester

The melt viscosity was measured under the conditions of the temperature set to the melting point of the liquid crystalline polyester+10° C. and the shear rate of 1000/second by Koka-type flow tester CFT-500D (orifice: 0.54φ×10 mm) (manufactured by Shimadzu Corporation).

Thermoplastic Resin

N6: CM1010 manufactured by Toray Industries, Inc. (nylon 6)

PBT: 1100S manufactured by Toray Industries, Inc. (polybutylene terephthalate)

PPS: M3910 manufactured by Toray Industries, Inc. (polyphenylene sulfide)

The following describes (A) liquid crystalline polyesters as the thermoplastic resin, (B) carbon blacks, (C) glass fibers, (D) talc, (E) mica and (X) melt-kneading conditions with twin-screw extruder according to respective Examples and Comparative Examples.

(A) Liquid Crystalline Polyester

Reference Example 1

Synthesis of Liquid Crystalline Polyester (A-1)

In a 5L reaction vessel with stirring blades and a distillation pipe, 870 grams (6.30 mol) of p-hydroxybenzoic acid, 327 grams (1.89 mol) of 4,4'-dihydroxybiphenyl, 89 grams (0.81 mol) of hydroquinone, 292 grams (1.76 mol) of terephthalic acid, 157 grams (0.95 mol) of isophthalic acid and 1367 grams of acetic anhydride (1.03 equivalents of the total amount of phenolic hydroxyl group) were mixed, were reacted with stirring in nitrogen atmosphere at 145° C. for 2 hours and were then heated to 320° C. in 4 hours. After that, with keeping the polymerization temperature at 320° C., the reaction vessel was depressurized to 1.0 mmHg (133 Pa) in 1.0 hour and the reaction further proceeded for another 90 minutes. The polycondensation was completed when the torque required for stirring reached 15 kg·cm. The reaction vessel was then pressurized to 1.0 kg/cm² (0.1 MPa), and the polymer was formed in strands through a nozzle having a circular outlet of 10 mm in diameter, and was pelletized with a cutter to the liquid crystalline polyester (A-1).

The composition analysis was performed for this liquid crystalline polyester (A-1). The liquid crystalline polyester (A-1) had p-oxybenzoate unit (structural unit (I)), 4,4'-dioxybiphenyl unit (structural unit (II)), 1,4-dioxybenzene unit (structural unit (III)), terephthalate unit (structural unit (IV)) and isophthalate unit (structural unit (V)). The liquid crystalline polyester (A-1) contained 70 mol % of the p-oxybenzoate unit (structural unit (I)) relative to the total amount of the p-oxybenzoate unit (structural unit (I)), the 4,4'-dioxybiphenyl unit (structural unit (II)) and the 1,4-dioxybenzene unit (structural unit (III)). The liquid crystalline polyester (A-1) also contained 70 mol % of the 4,4'-dioxybiphenyl unit (structural unit (II)) relative to the total amount of the 4,4'-dioxybiphenyl unit (structural unit (II)) and the 1,4-dioxybenzene unit (structural unit (III)). The liquid crystalline polyester (A-1) also contained 65 mol % of the terephthalate unit (structural unit (IV)) relative to the total amount of the terephthalate unit (structural unit (IV)) and the isophthalate unit (structural unit (V)). The total amount of the 4,4'-dioxybiphenyl unit (structural unit (II)) and the 1,4-dioxybenzene unit (structural unit (III)) was 23 mol % relative to the total amount of the structural units. The total amount of the terephthalate unit (structural unit (IV)) and the isophthalate unit (structural unit (V)) was 23 mol % relative to the total amount of the structural units. The melting point (Tm) of the liquid crystalline polyester (A-1) was 314° C. The melt viscosity measured at the temperature of 324° C. and the shear rate of 1000/s with the Koka-type flow tester (orifice of 0.5 φ×10 mm) was 20 Pa·s.

Reference Example 2

Synthesis of Liquid Crystalline Polyester (A-2)

In a polymerization vessel, 994 grams (7.20 mol) of p-hydroxybenzoic acid, 126 grams (0.68 mol) of 4,4'-dihydroxybiphenyl, 112 grams (0.68 mol) of terephthalic acid, 159 grams (1.13 mol) of polyethylene terephthalate having the intrinsic viscosity of about 0.6 dl/g and 960 grams of acetic anhydride (1.10 equivalents of the total amount of phenolic hydroxyl group) were mixed, were reacted with stirring in nitrogen atmosphere for 3 hours with heating to 150° C. The reaction mixture was subsequently heated from 150° C. to 250° C. in 2 hours and further heated from 250° C. to 330° C. in 1.5 hours, was subjected to pressure reduction to 1.0 mmHg (133 Pa) at 325° C. in 1.5 hours, and was further stirred for 0.25 hours. The polycondensation was completed when the torque required for stirring reached 12 kg·cm. The reaction vessel was then pressurized to 1.0 kg/cm$^2$ (0.1 MPa), and the polymer was formed in strands through a nozzle having a circular outlet of 10 mm in diameter, and was pelletized with a cutter to the liquid crystalline polyester (A-2).

The composition analysis was performed for this liquid crystalline polyester (A-2). The liquid crystalline polyester had 66.7 mol % of the p-oxybenzoate unit (structural unit (I)), 6.3 mol % of the 4,4'-dioxybiphenyl unit (structural unit (II)), 10.4 mol % of polyethylene terephthalate-derived ethylenedioxy unit and 16.6 mol % of the terephthalate unit (structural unit (IV)). The melting point (Tm) was 314° C. The melt viscosity measured at the temperature of 324° C. and the shear rate of 1000/s with the Koka-type flow tester (orifice of 0.5 φ×10 mm) was 25 Pa·s.

Reference Example 3

Synthesis of Liquid Crystalline Polyester (A-3)

According to JP S54-77691A, in a reaction vessel with stirring blades and a distillation pipe, 921 parts by weight of p-acetoxybenzoic acid and 435 parts by weight of 6-acetoxy-naphthoic acid were mixed and polycondensated. The resulting liquid crystalline polyester (A-3) had 57 mol equivalents of p-acetoxybenzoic acid-derived structural unit (structural unit (I)) and 22 mol equivalents of 6-acetoxynaphthoic acid-derived structural unit. The melting point (Tm) was 283° C. The melt viscosity measured at the temperature of 293° C. and the shear rate of 1000/s with the Koka-type flow tester (orifice of 0.5 φ×10 mm) was 30 Pa·s.

(B) Carbon Black
- (B-1) "LampBlack 101" manufactured by Evonik Degussa Japan Co., Ltd. (primary particle diameter: 95 nm, DBP absorption amount/primary particle diameter: 1.23 (ml/100 g·nm), BET specific surface area 20 (m$^2$/g), lampblack type);
- (B-2) "HIBLACK 170" manufactured by Evonik Degussa Japan Co., Ltd. (primary particle diameter: 75 nm, DBP absorption amount/primary particle diameter: 1.07 (ml/100 g·nm), BET specific surface area 23 (m$^2$/g), furnace black type);
- (B-3) "Raven 22" manufactured by Columbian Chemicals Co. (primary particle diameter: 83 nm, DBP absorption amount/primary particle diameter: 1.38 (ml/100 g·nm), BET specific surface area 28 (m$^2$/g), furnace black type);
- (B-4) "#25" manufactured by Mitsubishi Chemical Co., Ltd. (primary particle diameter: 47 nm, DBP absorption amount/primary particle diameter: 1.47 (ml/100 g·nm), BET specific surface area 55 (m$^2$/g), furnace black type); and
- (B-5) "Raven 14" manufactured by Columbian Chemicals Co. (primary particle diameter: 55 nm, DBP absorption amount/primary particle diameter: 2.02, BET specific surface area 44 (m$^2$/g), lampblack type)

(C) Glass Fiber
- (C-1) "chopped strand ECS03 T-747H" manufactured by Nippon Electric Glass Co., Ltd. (number-average fiber length: 3.0 mm, number-average fiber diameter: 10.5 μm); and
- (C-2) "milled fiber EPG70M-01N" manufactured by Nippon Electric Glass Co., Ltd. (number-average fiber length: 70 μm, number-average fiber diameter: 9 μm).

(D) Talc
- (D-1) "NK64" manufactured by by Fuji Talc Industrial Co., Ltd. (median diameter: 19 μm)

(E) Mica
- (E-1) "A-41" manufactured by Yamaguchi Mica Co., Ltd. (average particle diameter: 43 μm)

(X) Melt-Kneading Condition with Twin-Screw Extruder
- (X-1) The thermoplastic resin composition was melt-kneaded under the following conditions using a twin-screw extruder of 58 mm in barrel inner diameter with a middle input port and with screws of 57.2 mm in diameter: the initial residence time of the thermoplastic resin composition along the length from the material input port (L0) of the thermoplastic resin and the carbon black to the position of 3 L/10 was 10% of the entire residence time; the screw rotation speed was 450 rpm; the maximum shear rate in the kneading section was 3414 (sec$^{-1}$); and the cylinder temperature was set to the melting point of the thermoplastic resin +10° C. In the composition containing a filler, the filler was added from the middle input port, and pellets of the thermoplastic resin composition were produced. The maximum shear rate (sec$^{-1}$) in the kneading section was calculated from the barrel inner diameter D (mm) of the extruder, the minimum clearance S (mm) between the inner wall of the barrel and the kneading disk and the screw rotation speed n (rpm) according to the following equation:

$$\gamma max = D \times n \times \pi / (60 \times S).$$

- (X-2) The thermoplastic resin composition was melt-kneaded under the following conditions using the same twin-screw extruder as that of (X-1): the initial residence time of the thermoplastic resin composition along the length from the material input port (L0) of the thermoplastic resin and the carbon black to the position of 3 L/10 was 20% of the entire residence time; the screw rotation speed was 450 rpm; the maximum shear rate in the kneading section was 3414 (sec$^{-1}$); and the cylinder temperature was set to the melting point of the thermoplastic resin +10° C. In the composition containing a filler, the filler was added from the middle input port, and pellets of the thermoplastic resin composition were produced.

Liquid crystalline polyester compositions of Examples and Comparative Examples were produced from the liquid crystalline polyester (A) and the carbon black (B) and optionally the glass fiber (C), the talc (D) and the mica (E) described above. The properties of the respective liquid crystalline polyester compositions were evaluated by the following procedures.

(1) Maximum Particle Diameter of Carbon Black

The total cross sectional area 10 cm2 of the pellets of the thermoplastic resin composition produced in each of Examples and Comparative Examples was observed at the 500-fold to 1000-fold magnification with an optical microscope. Among the observed secondary particles of the carbon black, the diameter of the maximum secondary particle was measured as the maximum particle diameter. When the particle diameter was not observable by observation at the 1000-fold magnification, the maximum particle diameter was determined to be less than 10 µm.

(2) Insulating Property

Figure 1:
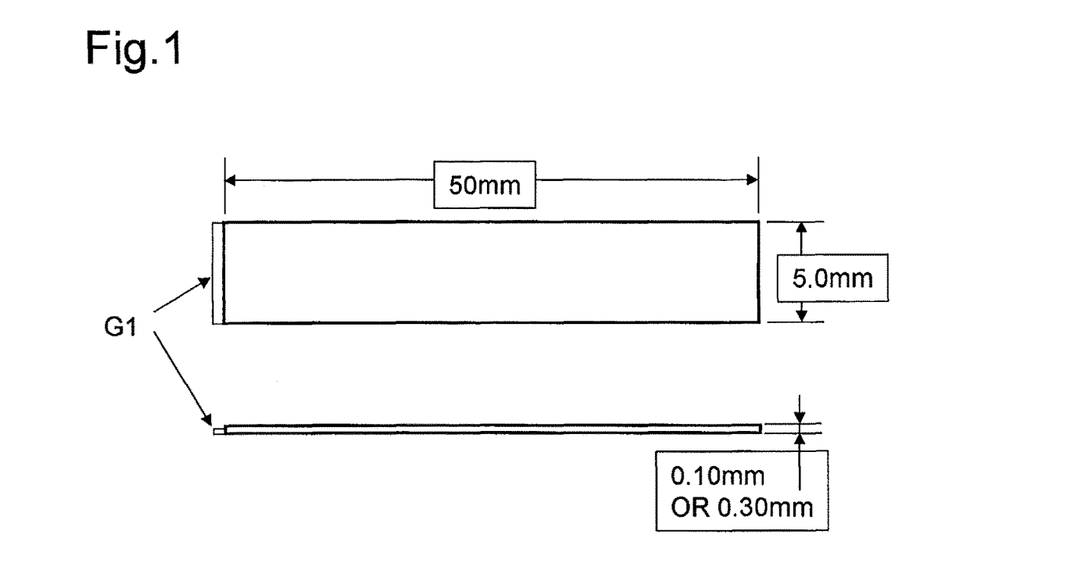
FIG. 1 is a diagram schematically illustrating a thin-wall test piece for evaluation of insulating property and thin-wall flow stability according to an example.
Figure 2:
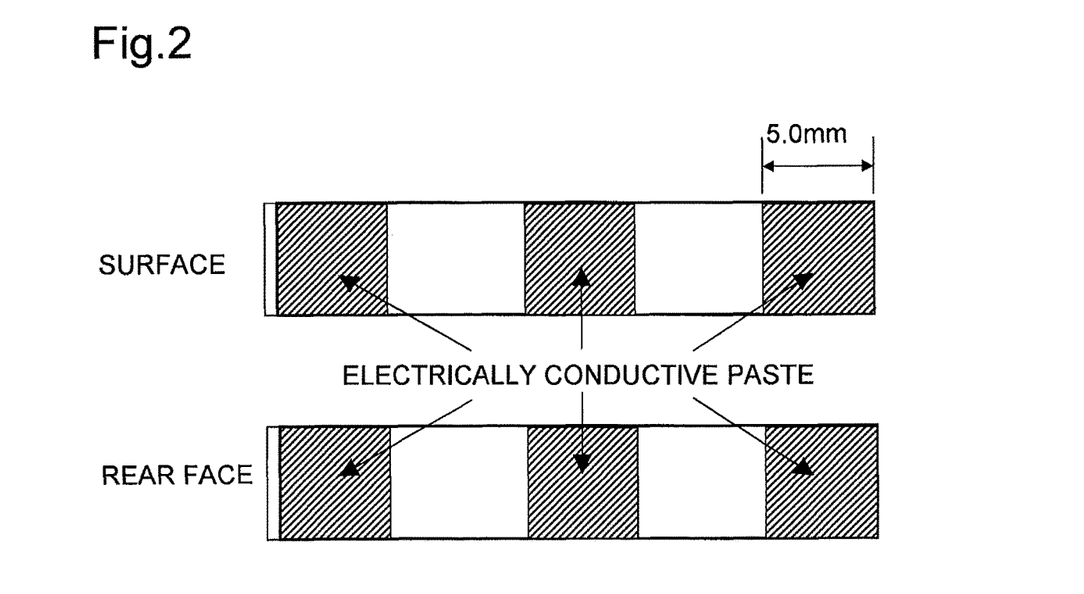
FIG. 2 is a diagram schematically illustrating a thin-wall test piece with application of electrically conductive paste for evaluation of insulating property.

Among the thermoplastic resin compositions produced in the respective Examples and Comparative Examples, each of the liquid crystalline polyester compositions was continuously molded to a thin-wall test piece shown in FIG. 1 (test piece of 0.10 mm in thickness, 50 mm in length and 5.0 mm in width) using Sodick TR30EHA (manufactured by Sodick Plustech Co., Ltd.) at the injection speed of 500 (mm/second) and the molding temperature set to the melting point of the liquid crystalline polyester+20° C. Each of the thermoplastic resin compositions other than the liquid crystalline polyester compositions was continuously molded to a thin-wall test piece of 0.30 mm in thickness, 50 mm in length and 5.0 mm in width. With regard to 1000 shots of the thin-wall test piece thus produced, an electrically conductive paste (DOTITE (registered trademark) manufactured by Fujikura Kasei Co., Ltd.) was applied in the dimensions shown in FIG. 2 at three locations of the test piece, i.e., neighborhood of the gate (G1), the center and the fill end of the test piece. The electrical resistance of the test piece with application of the electrically conductive paste in the thickness direction was measured with an insulation resistance meter. The number of locations with the electrical resistance of not higher than 1000 MΩ was calculated out of the total 3000 locations=1000 shots×3 locations. The composition having a less number of locations with the electrical resistance of not higher than 1000 MΩ is preferable, but the composition having 50 or less locations with the electrical resistance of not higher than 1000 MΩ is practically of no problem.

(3) Thin-wall Flow Stability

Among the thermoplastic resin compositions produced in the respective Examples and Comparative Examples, each of the liquid crystalline polyester compositions was continuously molded to 50 shots of the thin-wall test piece shown in FIG. 1 using Sodick TR30EHA (manufactured by Sodick Plustech Co., Ltd.) at the injection speed of 400 (mm/second) and the molding temperature set to the melting point of the liquid crystalline polyester+20° C. The difference between the maximum flow length and the minimum flow length of the molded test piece was then evaluated. Each of the thermoplastic resin compositions other than the liquid crystalline polyester compositions was continuously molded to 50 shots of the thin-wall test piece of 0.30 mm in thickness, 50 mm in length and 5.0 mm in width. The difference between the maximum flow length and the minimum flow length of the molded test piece was then evaluated. The smaller difference between the maximum flow length and the minimum flow length indicates a less variation, better thin-wall flow stability, and less likelihood of the occurrence of random short in injection molding. The composition having the difference between the maximum flow length and the minimum flow length of greater than 2.0 mm has high likelihood of the occurrence of random short in injection molding.

(4) Evaluation of Fall-off of Resin Composition Powder

The thin-wall test piece shown in FIG. 1 was produced from the pellets of the thermoplastic resin composition obtained in each of Examples and Comparative Examples by the same procedure as that for evaluation of the insulating property. The thin-wall test piece thus produced was placed in 200 ml of pure water and was subjected to ultrasonic cleaning with the power of 40 kHz and 100 W for 60 seconds. The pure water of 200 ml after the ultrasonic cleaning was filtrated with a membrane filter of 30 mm in diameter and 1.0 µm in pore diameter, and the number of the residual matters on the filter was measured. The composition was evaluated as: excellent (double circle) for residual matters of less than 10; good (circle) for 10 to 30 residual matters; and poor (cross mark) for residual matters of greater than 30.

The following describes the thermoplastic resin compositions of Examples 1 to 26 and Comparative Examples 1 to 14 produced from the liquid crystalline polyester (A) and the carbon black (B) and optionally the glass fiber (C), the talc (D) and the mica (E) described above.

Examples 1 to 26, Comparative Examples 1 to 14

The carbon black (B) and the inorganic filler (C) shown in Tables 1 and 2 were added to 100 parts by weight of the thermoplastic resin shown in Tables 1 and 2, and the mixture was melt-kneaded under the melt-kneading conditions shown in Tables 1 and 2 to give pellets of the thermoplastic resin composition. The pellets of the thermoplastic resin composition was evaluated for the maximum particle diameter of carbon black, the insulating property, the thin-wall flow stability and the fall-off of resin composition by the methods described above. The results of evaluation are shown in Tables 1 and 2.

TABLE 1

| | Thermoplastic Resin (100 parts by weight) | (B) Carbon Black Type | Amount Added (parts by weight) | Melt-kneading Conditions | Maximum Particle Diameter of Carbon Black in Composition (µm) | Insulating Property Number of Insulation Failure Locations (locations) | Thin-wall Flow Stability Maximum Flow Length a (mm) | Minimum Flow Length b (mm) | a − b (mm) | Fall-off of Resin Composition Evaluation |
|---|---|---|---|---|---|---|---|---|---|---|
| EX 1 | A-1 | B-1 | 10 | X-1 | <10 | 0 | 37.6 | 37.4 | 0.2 | ◎ |
| EX 2 | NS | B-1 | 10 | X-1 | <10 | 0 | 22.0 | 21.7 | 0.3 | ◎ |

TABLE 1-continued

| | Thermoplastic Resin (100 parts by weight) | (B) Carbon Black Type | Amount Added (parts by weight) | Melt-kneading Conditions | Maximum Particle Diameter of Carbon Black in Composition (μm) | Insulating Property Number of Insulation Failure Locations (locations) | Thin-wall Flow Stability Maximum Flow Length a (mm) | Minimum Flow Length b (mm) | a − b (mm) | Fall-off of Resin Composition Evaluation |
|---|---|---|---|---|---|---|---|---|---|---|
| EX 3 | PBT | B-1 | 10 | X-1 | <10 | 0 | 24.0 | 23.6 | 0.4 | ⊚ |
| EX 4 | PPS | B-1 | 10 | X-1 | <10 | 0 | 25.0 | 24.8 | 0.2 | ⊚ |
| EX 5 | A-1 | B-1 | 1.0 | X-1 | <10 | 0 | 41.8 | 41.6 | 0.2 | ⊚ |
| EX 6 | A-1 | B-1 | 15 | X-1 | <10 | 0 | 30.9 | 29.1 | 1.8 | ⊚ |
| EX 7 | A-1 | B-1 | 10 | X-2 | 13 | 5 | 35.3 | 35.0 | 0.3 | ⊚ |
| EX 8 | A-1 | B-2 | 10 | X-1 | 35 | 29 | 35.0 | 34.0 | 1.0 | ○ |
| EX 9 | A-1 | B-3 | 10 | X-1 | <10 | 0 | 35.1 | 35.0 | 0.1 | ⊚ |
| EX 10 | A-2 | B-1 | 10 | X-1 | 38 | 35 | 38.5 | 37.1 | 1.4 | ○ |
| EX 11 | A-3 | B-1 | 10 | X-1 | 49 | 48 | 34.3 | 32.4 | 1.9 | ○ |
| EX 12 | A-1 | B-1 | 3.0 | X-1 | <10 | 0 | 38.8 | 38.7 | 0.1 | ⊚ |
| EX 13 | A-2 | B-1 | 3.0 | X-1 | 34 | 21 | 41.0 | 39.7 | 1.3 | ○ |
| EX 14 | A-1 | B-1 | 0.3 | X-1 | 25 | 8 | 42.2 | 41.5 | 0.7 | ○ |
| COMP EX 1 | A-1 | B-4 | 10 | X-1 | 570 | 648 | 33.5 | 16.5 | 17.0 | X |
| COMP EX 2 | A-1 | B-5 | 10 | X-1 | 140 | 72 | 33.8 | 20.8 | 13.0 | X |
| COMP EX 3 | A-1 | B-5 | 10 | X-2 | 200 | 168 | 32.2 | 18.1 | 14.1 | X |
| COMP EX 4 | A-1 | B-5 | 1.0 | X-1 | 160 | 62 | 35.0 | 21.2 | 13.8 | X |
| COMP EX 5 | A-2 | B-5 | 10 | X-1 | 154 | 200 | 37.8 | 23.3 | 14.5 | X |
| COMP EX 6 | A-3 | B-5 | 10 | X-1 | 278 | 204 | 31.0 | 15.9 | 15.1 | X |
| COMP EX 7 | A-1 | B-5 | 3.0 | X-1 | 144 | 85 | 34.2 | 21.1 | 13.1 | X |
| COMP EX 8 | A-2 | B-5 | 3.0 | X-1 | 260 | 200 | 38.5 | 22.9 | 15.8 | X |
| COMP EX 9 | A-1 | B-1 | 25 | X-1 | 15 | 1650 | 25.3 | 22.9 | 2.4 | ○ |

A-1: LX
A-2: L301
A-3: A950
B-1: LampBlack101
B-2: HIBLACK101
B-3: #10
B-4: #45
B-5: Raven14
B-6: AROSPERSE15

TABLE 2

| | Thermoplastic Resin (100 parts by weight) | (B) Carbon Black Type | Amount Added (parts by weight) | (C) Inorganic Filler Type | Content Relative to 100 parts by weight of (A) + (B) (parts by weight) | Melt-kneading Conditions | Maximum Particle Diameter of Carbon Black in Composition (μm) | Insulating Property Number of Insulation Failure Locations (locations) | Thin-wall Flow Stability Maximum Flow Length a (mm) | Minimum Flow Length b (mm) | a − b (mm) | Fall-off of Resin Composition Evaluation |
|---|---|---|---|---|---|---|---|---|---|---|---|---|
| EX 15 | A-1 | B-1 | 10 | C-1 | 100 | X-1 | <10 | 0 | 10.9 | 10.2 | 0.7 | ○ |
| EX 16 | A-1 | B-1 | 10 | C-1 | 20 | X-1 | <10 | 0 | 14.3 | 13.8 | 0.5 | ○ |
| EX 17 | A-1 | B-1 | 10 | C-1 | 100 | X-2 | 13 | 4 | 10.3 | 9.7 | 0.6 | ○ |
| EX 18 | A-1 | B-1 | 10 | C-2 | 100 | X-1 | <10 | 0 | 17.8 | 17.6 | 0.2 | ⊚ |
| EX 19 | A-1 | B-1 | 3.0 | C-2 | 50 | X-1 | <10 | 0 | 19.3 | 19.2 | 0.1 | ⊚ |
| EX 20 | A-1 | B-1 | 10 | C-1/D-1 | 50/50 | X-1 | <10 | 0 | 10.4 | 9.9 | 0.5 | ○ |
| EX 21 | A-1 | B-1 | 3.0 | D-1 | 50 | X-1 | <10 | 0 | 17.8 | 17.5 | 0.3 | ⊚ |
| EX 22 | A-1 | B-1 | 10 | E-1 | 100 | X-1 | <10 | 0 | 19.5 | 19.3 | 0.2 | ⊚ |
| EX 23 | A-1 | B-1 | 10 | E-1 | 20 | X-1 | <10 | 0 | 22.5 | 22.3 | 0.2 | ⊚ |
| EX 24 | A-1 | B-1 | 3.0 | E-1 | 50 | X-1 | <10 | 0 | 20.8 | 20.6 | 0.2 | ⊚ |
| EX 25 | A-2 | B-1 | 10 | E-1 | 100 | X-1 | 35 | 33 | 20.8 | 19.8 | 1.0 | ○ |
| EX 26 | A-1 | B-1 | 1.0 | C-2 | 100 | X-1 | <10 | 0 | 19.1 | 18.8 | 0.3 | ⊚ |
| COMP EX 10 | A-1 | B-4 | 10 | C-1 | 100 | X-1 | 488 | 616 | 9.8 | 0.0 | 9.8 | X |
| COMP EX 11 | A-1 | B-5 | 10 | C-1 | 100 | X-1 | 132 | 53 | 10.2 | 4.0 | 6.2 | X |
| COMP EX 12 | A-1 | B-4 | 3.0 | C-1 | 50 | X-1 | 438 | 599 | 11.2 | 1.5 | 9.7 | X |
| COMP EX 13 | A-1 | B-5 | 3.0 | C-1 | 50 | X-1 | 144 | 55 | 11.7 | 5.1 | 6.6 | X |

TABLE 2-continued

| Thermo-plastic Resin (100 parts by weight) | (B) Carbon Black | | (C) Inorganic Filler | | Melt-kneading Conditions | Maximum Particle Diameter of Carbon Black in Composition (μm) | Insulating Property Number of Insulation Failure Locations (locations) | Thin-wall Flow Stability | | | Fall-off of Resin Composition Evaluation |
|---|---|---|---|---|---|---|---|---|---|---|---|
| | Type | Amount Added (parts by weight) | Type | Content Relative to 100 parts by weight of (A) + (B) (parts by weight) | | | | Maximum Flow Length a (mm) | Minimum Flow Length b (mm) | a − b (mm) | |
| COMP EX 14 | A-2 | B-5 | 3.0 | C-1 | 50 | X-1 | 210 | 205 | 13.0 | 6.1 | 6.9 | X |

Figure 3A:
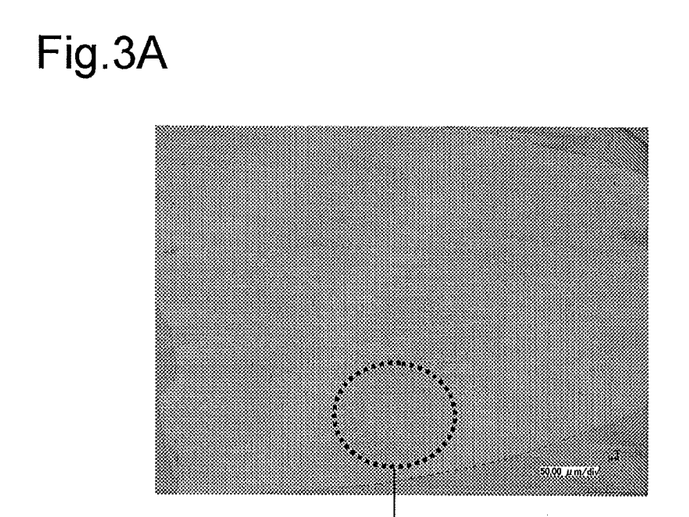
FIG. 3 is an optical micrograph of the cross section of pellets produced in Example 1.
Figure 3B:
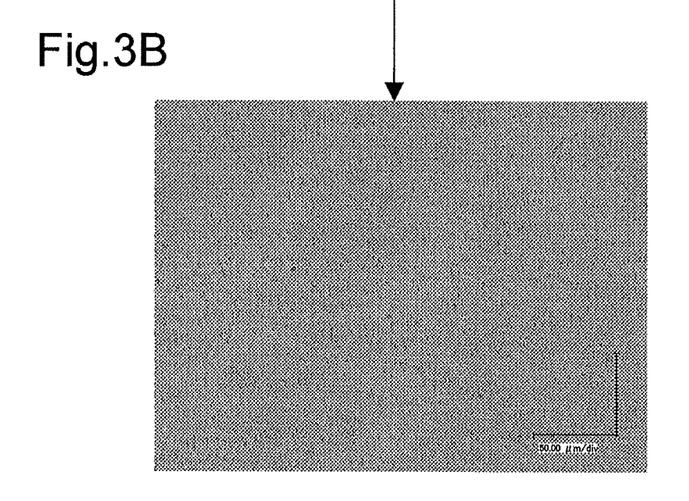
Figure 4A:
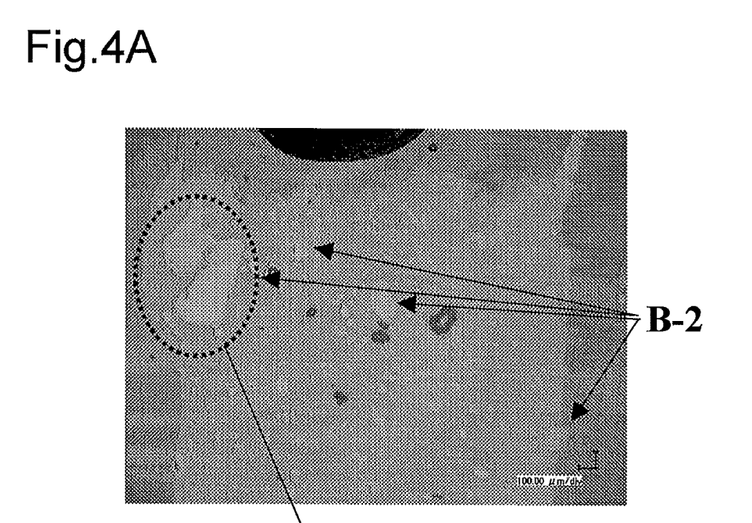
FIG. 4 is an optical micrograph of the cross section of pellets produced in Comparative Example 1.
Figure 4B:
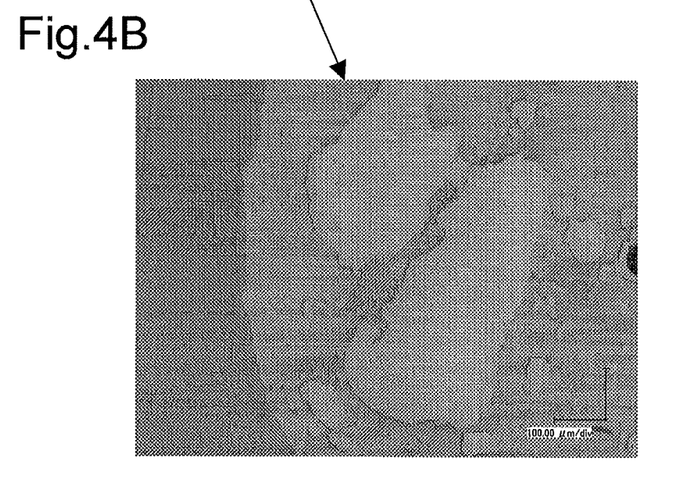

A-1: LX
A-2: L301
A-3: A950
B-1: LampBlack101
B-2: HIBLACK101
B-3: #10
B-4: #45
B-5: Raven14
B-6: AROSPERSE15
C-1: GF
C-2: MF
D-1: Talc
E-1: Mica FIG. 3 shows an optical micrograph of the cross section of the pellets produced in Example 1. FIG. 3B is a partial enlargement of FIG. 3A wherein each photograph was taken with each division of 50 μm. The observation proved no presence of carbon black particles. FIG. 4 shows an optical micrograph of the cross section of the pellets produced in Comparative Example 1. FIG. 4B is a partial enlargement of FIG. 4A wherein each photograph was taken with each division of 100 μm. The observation proved the presence of a large number of carbon black particles (B-4) having the particle diameter of greater than 50 μm.

As clearly understood from the above results, the molded products produced from the thermoplastic resin compositions have the better insulating property, the better thin-wall flow stability and the better effect of reducing the resin composition powder falling off the surface of the molded product in applications requiring black color, compared with the molded products produced in Comparative Examples.

INDUSTRIAL APPLICABILITY

The thermoplastic resin composition has the excellent thin-wall flow stability and reduces the occurrence of failure in molding, such as the occurrence of random short. The molded product produced from the thermoplastic resin composition has the excellent insulating property and the reduced fall-off of the resin composition powder, for example, during assembly. The thermoplastic resin composition is thus preferably used for a molded product of black color that is required to have insulating properties and includes thin-wall parts: for example, small electric and electrical components such as narrow-pitch connectors, ECU connectors, switches, coil bobbins for small motors, relay components; camera module components used for cell phones and digital cameras; LED covers and their peripheral components.

The invention claimed is:
1. A thermoplastic resin composition comprising 0.1 to 20 parts by weight of a carbon black having an arithmetic average of a primary particle diameter of 70 to 200 nm relative to 100 parts by weight of a thermoplastic resin, wherein the thermoplastic resin is a liquid crystalline polyester, the carbon black has a ratio (a1/a2) of (a1) DBP absorption amount (m/l 100g) to (a2) primary particle diameter (nm) of the carbon black that is 1.07 to 1.5 (m/l 100 g·nm), the carbon black has a specific surface area of 10 to 40 ($m^2$/g) as determined by BET low-temperature nitrogen adsorption method, and the carbon black is dispersed in the thermoplastic resin composition to have a maximum diameter of an aggregate of not greater than 50 μm, the liquid crystalline polyester has structural units (I), (II), (III), (IV) and (V), wherein content of the structural unit (I) is 65 to 80 mol % relative to a total amount of the structural units (I), (II) and (III), content of the structural unit (II) is 55 to 85 mol % relative to a total amount of the structural units (II) and (III), and content of the structural unit (IV) is 50 to 95 mol % relative to a total amount of the structural units (IV) and (V)

(V)

2. The thermoplastic resin composition according to claim 1, wherein the thermoplastic resin is a liquid crystalline polyester that forms an anisotropic melt phase.

3. The thermoplastic resin composition according to claim 1, further comprising 1 to 200 parts by weight of an inorganic filler relative to a total 100 parts by weight of the thermoplastic resin and the carbon black.

4. The thermoplastic resin composition according to claim 2, further comprising 1 to 200 parts by weight of an inorganic filler relative to a total 100 parts by weight of the thermoplastic resin and the carbon black.

5. The thermoplastic resin composition according to claim 1, molded into a molded product.

6. The thermoplastic resin composition according to claim 2, molded into a molded product.

* * * * *

UNITED STATES PATENT AND TRADEMARK OFFICE
CERTIFICATE OF CORRECTION

PATENT NO. : 9,947,433 B2
APPLICATION NO. : 14/006798
DATED : April 17, 2018
INVENTOR(S) : Fujino et al.

It is certified that error appears in the above-identified patent and that said Letters Patent is hereby corrected as shown below:

In the Specification

<u>In Column 19</u>
At Table 1-continued, at the subheading "Carbon Black in Composition", at row 20, please change "260" to -- 266 --.

Signed and Sealed this
Thirtieth Day of October, 2018

Andrei Iancu
*Director of the United States Patent and Trademark Office*